US005583732A

United States Patent [19]

Seymour et al.

[11] Patent Number: 5,583,732

[45] Date of Patent: Dec. 10, 1996

[54] MODULAR CURRENT TRANSFORMER FOR ELECTRONIC CIRCUIT INTERRUPTERS

[75] Inventors: Raymond K. Seymour, Plainville, Conn.; Ertugrul Berkcan, Niskayuna, N.Y.

[73] Assignee: General Electric Company, New York, N.Y.

[21] Appl. No.: 358,493

[22] Filed: Dec. 19, 1994

[51] Int. Cl.$^6$ .............................. H02H 3/00; H01F 21/06

[52] U.S. Cl. ........................... 361/93; 361/115; 336/131; 336/196; 336/221

[58] Field of Search ............................... 361/93–98, 115; 336/131, 196, 221, 233

[56] References Cited

U.S. PATENT DOCUMENTS

| | | | |
|---|---|---|---|
| 3,846,675 | 11/1974 | Shimp | 361/95 |
| 4,297,741 | 10/1981 | Howell | 361/93 |
| 4,591,942 | 5/1986 | Willard et al. | 361/97 |
| 4,672,501 | 6/1987 | Bilac et al. | 361/96 |
| 4,734,975 | 4/1988 | Ballard et al. | 29/606 |
| 4,796,148 | 1/1989 | Ruta | 361/97 |
| 4,937,757 | 6/1990 | Dougherty | 364/492 |
| 5,204,798 | 4/1993 | Scott | 361/93 |
| 5,231,378 | 6/1994 | Ferullo et al. | 335/202 |
| 5,302,786 | 4/1994 | Rosen et al. | 200/400 |
| 5,359,314 | 10/1994 | McQuay et al. | 336/192 |

*Primary Examiner*—Jeffrey A. Gaffin
*Assistant Examiner*—Michael J. Sherry
*Attorney, Agent, or Firm*—Richard A. Menelly; Carl B. Horton

[57] ABSTRACT

A modular current transformer containing both air and metal cores on a common load strap provides sensing current to the electronic trip unit within the circuit interrupter along with supplying operating power to the trip unit components.

20 Claims, 3 Drawing Sheets

MODULAR CURRENT TRANSFORMER FOR ELECTRONIC CIRCUIT INTERRUPTERS

BACKGROUND OF THE INVENTION

The advent of digital circuit implementation to the electrical distribution and control field has resulted in combining several electronic functions within a single modular enclosure. One example of a circuit interrupter having supplemental protective relay function is found in U.S. Pat. No. 4,672,501 entitled "Circuit Breaker and Protective Relay Unit".

To provide a continuos sample of the current level within an associated electrical distribution system, a current transformer is connected within the circuit interrupter, as described within U.S. Pat. Nos. 4,591,942 and 5,321,378 both entitled "Current Transformer Assembly". The current transformers as employed therein also derive operating power from the circuit current to power-up the electronic components within the circuit interrupter electronic trip unit. It has been found advantageous to use a single iron core current transformer to both sense the circuit current along with providing operational power to the electronic trip unit in higher ampere-rated circuit interrupters. To prevent the iron cores from becoming saturated at higher current levels, expensive magnetic steel laminates are used and the laminates are sized to allow short circuit current sensing without causing the cores to saturate.

U.S. Pat. No. 4,796,148 entitled "Current-Sensing Arrangement Utilizing Two Current-Sensing Signals" teaches the use of a separate air core transformer and a separate iron core transformer to increase the current sensing range when the iron core saturates.

U.S. Pat. No. 4,297,741 entitled "Rate Sensing Instantaneous Trip Mode Network" describes the use of an iron core transformer for sensing ordinary current overload levels along with a separate air core transformer to sense short circuit currents.

U.S. Pat. No. 3,846,675 entitled "Molded Case Circuit Breakers Utilizing Saturating Current Transformers" teaches the use of iron core transformers for providing operating power to the trip unit and separate air core transformers for monitoring the circuit current.

In lower ampere-rated electronic circuit interrupters, the current transformer size constraints require the use of expensive core steel laminations to optimize transformer action with the least possible amount of material without reaching saturation when such current transformers are used for both sensing circuit current as well as powering up the electronic trip unit circuit. It would be economically desirable to perform such sensing and power-up functions by use of a single transformer design for all the reasons given earlier.

One purpose of the invention is to describe a single transformer module that will provide the optimum sensing function of an air core transformer along with the optimum power-up function of an iron core transformer in one single modular assembly.

SUMMARY OF THE INVENTION

A modular current transformer containing both air and metal cores on a common load strap provides sensing current to the electronic trip unit within the circuit interrupter along with supplying operating power to the trip unit electronic components. The circuit interrupter load strap is shaped to provide the primary turn of a current transformer and a part of the strap is fitted with an iron core and an associated secondary transformer winding.

DESCRIPTION OF THE PREFERRED EMBODIMENT

Figure 1:
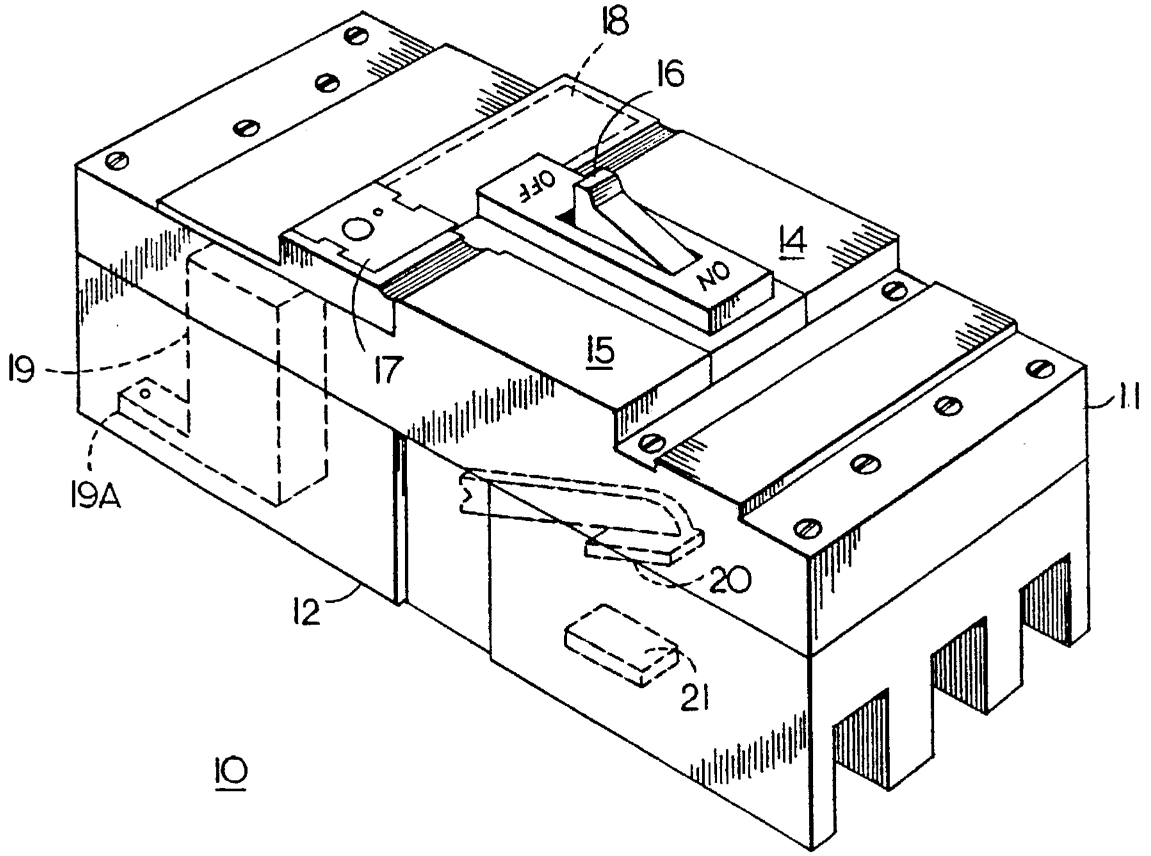
FIG. 1 is a top perspective view of a lower ampere-rated circuit interrupter containing the modular current transformer according to the invention.
Figure 2:
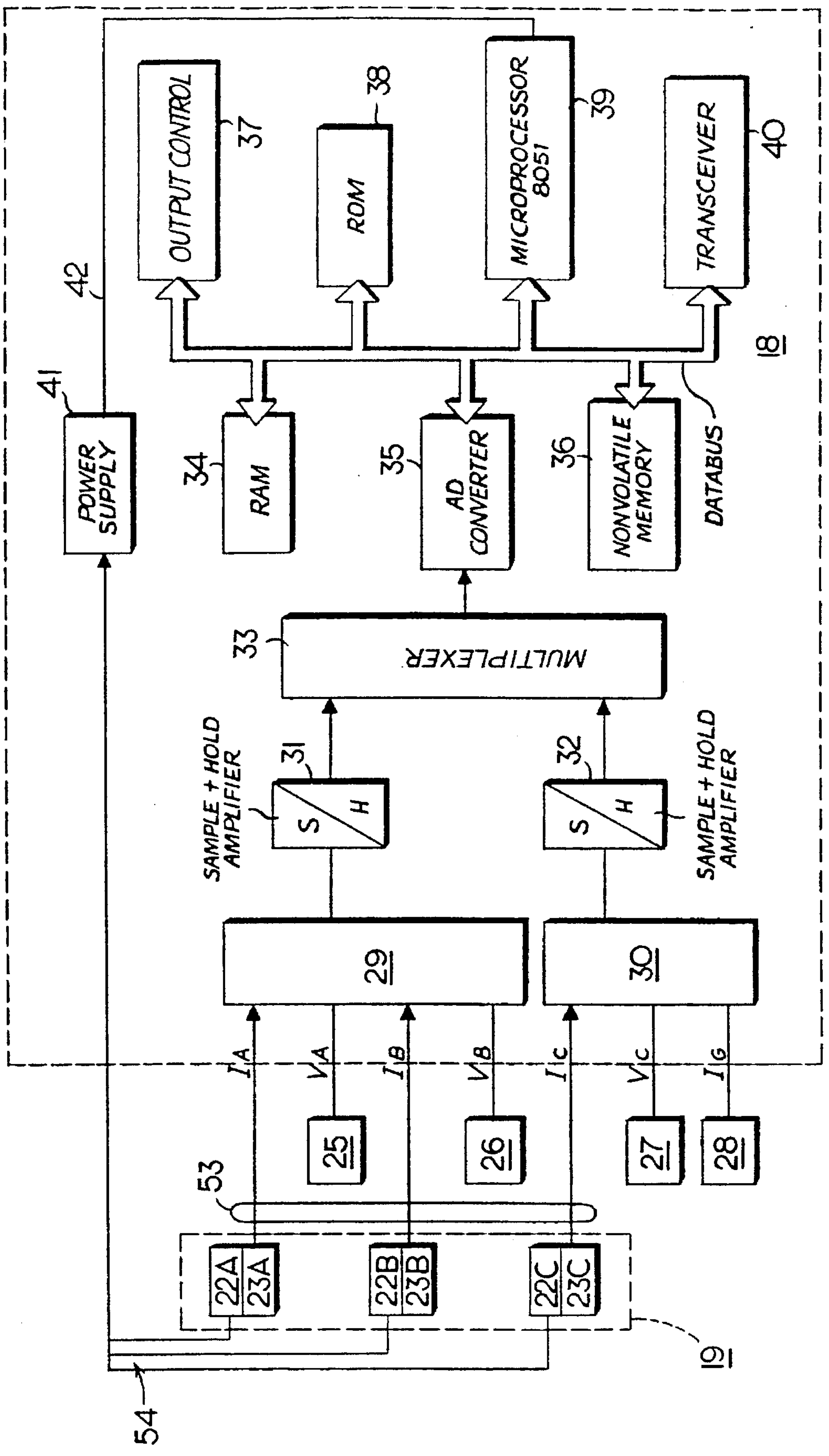
FIG. 2 is a diagrammatic representation of the circuit components used with the electronic trip unit within the circuit interrupter of FIG. 1.

A circuit interrupter 10 of the type consisting of a molded plastic cover 11 secured to a molded plastic case 12 is shown in FIG. 1. The provision of an accessory cover 13 and accessory doors 14, 15 allows field as well as factory installed electric accessories such as described in U.S. Pat. No. 5,302,786 entitled "Circuit Interrupter With Remote Control". An externally-accessible operating handle 16 controls the open and closed conditions of the movable contact 20, and fixed contact 21 located within the case to allow and interrupt current flow through an associate electrical distribution circuit. Automatic circuit protection against overload circuit conditions is provided by means of an electronic trip unit 18 located within the circuit interrupter cover, such as described within U.S. Pat. No. 4,937,757 entitled "Digital Circuit Interrupter with Selectable Trip Parameters". A rating plug 17 allows the circuit interruption rating to be set by externally accessing the electronic trip unit as described within U.S. Pat. No. 5,204,798 entitled "Metering Accessory for Molded Case Circuit Breakers". Connection with an external electrical distribution circuit is made by means of the load strap end 19A of the modular current transformer 19 which will be described below in greater detail. The operation of the trip unit 18 is best seen by now referring to FIG. 2.

The modular current transformer 19 is connected by means of a multi-conductor cable 54 to the trip unit power supply 41 to provide operating power to the trip unit 18 and power-up the microprocessor 39 over conductor 42. Current sensing of the associated electrical distribution circuit is made by means of the multi-conductor cable 53 that provides three phase currents IA, IB, IC through multiplexers 29,30 and sample and hold amplifiers 31,32 to the mutiplexer 33. At the same time, voltage samples are provided by means of the voltage transformers 25–27 located remote from the circuit interrupter and ground fault samples are provided by means of the ground fault current transformer 28 also located remote from the circuit interrupter. The sample current and voltage data is inputted to a databus through the A/D converter 35. The data is processed within the microprocessor 39 under operating instructions contained within the ROM 38 and stored overcurrent reference values contained within the RAM 34. Control signals are outputted via the output control circuit 37 to interrupt the circuit current when the overcurrent condition exists for longer than a prescribed time increment. Information to related circuit interrupters and accessory electrical devices is transmitted by means of the transceiver 40.

Figure 3:
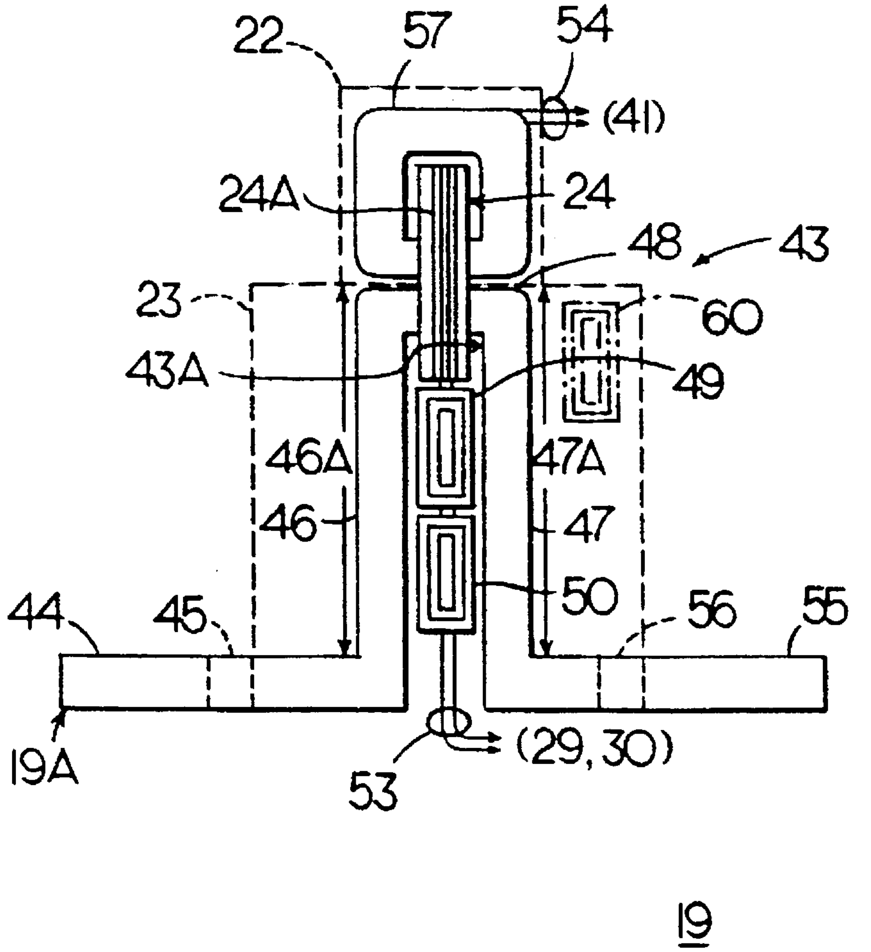
FIG. 3 is an enlarged side view of one embodiment of the modular current transformer within the circuit interrupter of FIG. 1.

In further accordance with the invention, the modular current transformer 19 has the configuration depicted in FIG. 3 in the form of a load strap 43 having a pair of legs 46, 47 joined by a bight 48, all fabricated from a unitary copper bar. The gap 43A defined between the two legs is selected to be substantially smaller than the height 46A,47A of both of the legs in order to provide a maximum magnetic field. A pair of multi-turn secondary windings 49,50 are electrically-connected in series to form the air core transformers 23A–23C that are connected via the two-conductor cable 53 to the multiplexers 29,30 shown earlier in FIG. 2. In some applications, to prevent inter-phasal noise from interfering with the current signals, a separate winding 50, as indicated in phantom, is electrically connected in series with the windings 49,50. In certain other applications, one of the windings 49,50 is eliminated and the remaining winding is electrically-connected in series with the winding 50, for still greater sensitivity and resistance to the inter-phasal noise. Electrical connection with the associated electrical equipment is made by means of the load strap part 19A defined by the base 44 which includes the thru-hole 45 for ease in connection with the interconnecting electrical conductors. Electrical connection with the circuit interrupter internal current-carrying components is made by means of the opposite base 55 which includes the thru-hole 56. In further accordance with the invention, an iron core 24 is arranged about the bight 48 and a multi-turn secondary winding 57 to form the iron core transformers 22A–22C that are connected via the two conductor cable 54 to the power supply 41 of FIG. 2.

In some electronic trip unit circuits, the small size requirements with the iron core transformers, allows the use of so-called "amorphous" metal within the iron core with low power loss and rapid transformer action. Such amorphous core transformers are described within U.S. Pat. No. 4,734,975 entitled "Amorphous Core Laminations" and U.S. Pat. No. 5,359,314 entitled "Core and Coil Assembly for an Amorphous Steel Core Electric Transformer".

A modular transformer having the capability of providing rapid power-up to the electrical components within and electronic trip unit along with extended current sensing without saturation has herein been described. The modular transformer having the dual functions allows the use of electronic trip units within lower ampere-rated circuit interrupters used within industrial facilities.

We claim:

1. A circuit breaker comprising:

a plastic case 12 and a plastic cover;

a pair of separable contacts 20,21 within said case and arranged for separation upon occurrence of an overcurrent condition in a protected electrical circuit;

an electronic trip unit 18 in said cover controlling said separable contacts and determining said overcurrent condition; and a modular transformer 19 within said case and electrically connected with said trip unit for providing current sensing and electric power to said trip unit, said transformer comprising a metal strap 43 configured to provide magnetic signal to a first winding magnetically-coupled to said strap by means of metal core 24 and a second winding 49 magnetically-coupled to said strap by means of an air gap 43A.

2. The circuit breaker of claim 1 including means 45 on a base 44 of said strap for connecting said strap with said protected electrical circuit.

3. The circuit breaker of claim 1 wherein said metal strap is configured in a U-shaped configuration having a pair of legs 46,47 joined by a bight 48 to define said air core, whereby said air core is smaller than said legs.

4. The circuit breaker of claim 1 wherein said first winding comprises a plurality of wire conductors.

5. The circuit breaker of claim 1 wherein said metal core comprises a plurality of magnetic steel laminates.

6. The circuit breaker of claim 3 wherein said metal core is arranged around said bight.

7. The circuit breaker of claim 1 wherein said second winding is contained within said air gap.

8. The circuit breaker of claim 7 wherein said second winding and said air gap comprise an air core transformer 23.

9. The circuit breaker of claim 7 wherein said first winding and said metal core comprise an iron core transformer 22.

10. The circuit breaker of claim 1 wherein said trip unit includes a power supply 41 and wherein said first winding is connected to said power supply for providing operating power to said power supply from said protected electrical circuit.

11. The circuit breaker of claim 10 wherein said trip unit further includes a microprocessor 39 for rendering said overcurrent determination, said power supply being connected to said microprocessor to power-up said microprocessor.

12. The circuit breaker of claim 11 wherein said second winding electrically connects with said microprocessor through a databus.

13. The circuit breaker of claim 9 wherein said metal core comprises amorphous metal.

14. The circuit breaker of claim 1 including a third winding outside of said air gap for reducing external magnetic interaction with said second winding.

15. An electronic trip unit for electric circuit interrupters comprising in combination:

a modular current transformer comprising a metal strap 43 configured to provide magnetic signal to a first winding magnetically-coupled to said strap by means of a metal core 24 and a second winding 49 magnetically-coupled to said strap by means of an air gap 43A;

a power supply 41 connected with a microprocessor 39 for providing operating power to said microprocessor, said microprocessor being arranged for determining overcurrent conditions within a protected electrical circuit;

whereby said first winding electrically connects with said power supply for providing operating power to said power supply from said electrical circuit and said second winding electrically connects with said microprocessor for providing sensing current to said microprocessor from said electrical circuit.

16. The electronic trip unit of claim 15 wherein said metal strap is configured in a U-shaped configuration having a pair of legs 46,47 joined by a bight 48 to define said air gap, whereby said air gap is smaller than said legs.

17. The electronic trip unit of claim 15 wherein said metal core is arranged around said bight.

18. The electronic trip unit of claim 15 wherein said second winding is contained within said air gap.

19. The electronic trip unit of claim 15 wherein said metal core comprises amorphous metal.

20. The electronic trip unit of claim 15 including a third winding outside of said air gap for reducing external magnetic interaction with said second winding.

* * * * *